US008892345B2

(12) United States Patent
Arcot et al.

(10) Patent No.: US 8,892,345 B2

(45) Date of Patent: Nov. 18, 2014

(54) TREND BASED PREDICTIVE TRAFFIC

(75) Inventors: Praveen J. Arcot, Naperville, IL (US); Matthew G. Lindsay, San Jose, CA (US); Timothy A. McGrath, Chicago, IL (US); Steven P. Devries, Schereville, IN (US)

(73) Assignee: HERE Global B.V., Veldhoven (NL)

(*) Notice: Subject to any disclaimer, the term of this patent is extended or adjusted under 35 U.S.C. 154(b) by 0 days.

(21) Appl. No.: 14/110,319

(22) PCT Filed: Apr. 6, 2012

(86) PCT No.: PCT/US2012/032490

§ 371 (c)(1),
(2), (4) Date: Oct. 7, 2013

(87) PCT Pub. No.: WO2012/138974

PCT Pub. Date: Oct. 11, 2012

(65) Prior Publication Data

US 2014/0032091 A1 Jan. 30, 2014

Related U.S. Application Data

(60) Provisional application No. 61/473,400, filed on Apr. 8, 2011.

(51) Int. Cl.
*G06F 19/00* (2011.01)
*G08G 1/00* (2006.01)
*G08G 1/01* (2006.01)

(52) U.S. Cl.
CPC ................ *G08G 1/00* (2013.01); *G08G 1/0141* (2013.01); *G08G 1/0129* (2013.01)
USPC ............ 701/119; 701/117; 429/143; 429/149

(58) Field of Classification Search
CPC ....... H01M 2/18; Y02E 60/12; G08G 1/0104; G08G 1/092; H04H 20/55
USPC .......................... 701/117, 119; 429/143, 149; 250/396 ML, 396 R
See application file for complete search history.

(56) References Cited

U.S. PATENT DOCUMENTS

| | | | | |
|---|---|---|---|---|
| 7,698,055 | B2 * | 4/2010 | Horvitz et al. | 701/117 |
| 7,940,741 | B2 * | 5/2011 | Lee et al. | 370/349 |
| 8,755,991 | B2 * | 6/2014 | Wynter et al. | 701/119 |
| 2006/0106530 | A1 | 5/2006 | Horvitz et al. | |
| 2006/0268736 | A1 | 11/2006 | Lee et al. | |
| 2008/0287144 | A1 * | 11/2008 | Sabata et al. | 455/456.6 |
| 2010/0063715 | A1 * | 3/2010 | Wynter et al. | 701/118 |
| 2011/0098915 | A1 * | 4/2011 | Disatnik et al. | 701/201 |

OTHER PUBLICATIONS

International Search Report and Written Opinion received in corresponding Patent Cooperation Treaty Application No. PCT/US2012/032490. Dated Jul. 6, 2012. 8 pages.

* cited by examiner

*Primary Examiner* — McDieunel Marc

(74) *Attorney, Agent, or Firm* — Lempia Summerfield Katz LLC

(57) ABSTRACT

A method for predicting traffic wherein the method is a trend based extrapolation method that uses real time traffic data and historic traffic data to generate a predictive traffic product. The predictive traffic product provides expected traffic speeds for the short term future, for example, between two to twelve hours into the future.

20 Claims, 5 Drawing Sheets

TREND BASED PREDICTIVE TRAFFIC

RELATED APPLICATION

This application was originally filed as PCT Application No. PCT/US2012/032490 filed Apr. 6, 2012.

RELATED APPLICATIONS

This application claims the benefit of the filing date under 35 U.S.C. §119(e) of U.S. Provisional Application Ser. No. 61/473,400 filed Apr. 8, 2011, which is hereby incorporated by reference.

BACKGROUND

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

Some navigations systems may further provide real time traffic data/and or historical traffic data, such as via a map overlay showing such data in relation to the associated roads and/or by factoring such data into travel time or estimated arrival time calculations, e.g. via color codes, etc. Such data is typically provided by a Traffic company. Real time traffic data provides a snapshot of the current traffic conditions on the roads. Historical traffic data, also referred to as "traffic patterns," provides expected speeds for any given time and day, not taking into account the current conditions. One such Traffic company is Navteq Corporation which provide the Navteq Traffic Patterns™ service. Traffic pattern data may reflect a composite value, such as an average, of the speed measured over a period of time, accounting for various known recurring, cyclical or permanent conditions, e.g. variations in time of day, day of week etc. The result is a service which provides a representation of the expected speed of a road for a variety of conditions.

It will be appreciated, however, that the nature of traffic pattern data as a composite of historical measured values, does not account for conditions or events which were previously unknown, have recently occurred or which are aberrations, i.e. unanticipated, unique and/or temporary, the occurrence of which may have a limited but durable effect on traffic speeds, at least in the near future. For example, a traffic accident may severely impact traffic speeds along a road for several hours after the accident has occurred, and even several hours after it has been cleared.

DETAILED DESCRIPTION

Figure 1:
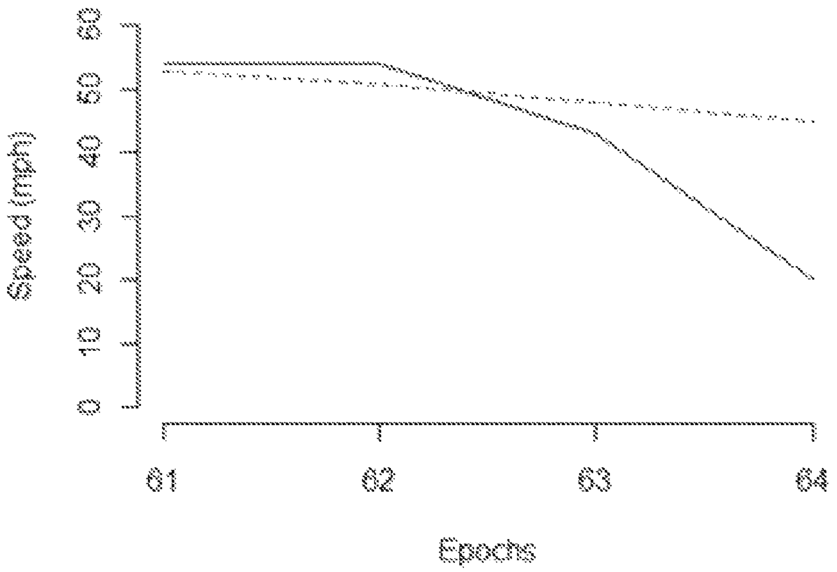
FIG. 1 is a graph showing the real time speeds (black) and historic traffic speeds (red dotted) for four epochs, according to an example.

The disclosed embodiments relate to the provision of accurate predicted traffic speeds for a future time period, such as the short term future, e.g., anywhere within or up to the next 12 hours or more from the present time, accounting, for example, for conditions or events which were previously unknown, have recently occurred or are aberrations, e.g. unanticipated, unique and/or temporary, the occurrence of which may have a limited but durable affect on traffic speeds. Generally, a trend based extrapolation methodology is utilized which uses real time ("RT") and historical/traffic pattern ("TP") speed values of a prior period of time, e.g. the previous 1 hour, as input, which results in predicted speeds that are more accurate than using traffic pattern speed values alone. The predicted speeds may be useful for users, for example, to estimate travel times more accurately for short term future trips. For example, the predictive traffic speed output will help users make decisions like when to start a trip to airport for a flight departing in the next couple of hours. This data may be utilized by navigation systems, governmental or regulatory agencies, news organizations, and/or other service providers to present users with accurate representations of expected road conditions and/or to compute accurate predicted travel times to a destination via various mediums such as a navigation system display, television, radio, SMS, electronic road sign, etc. In one application, a public or private bus system may utilize the disclosed embodiments to predict and publish, such as via electronic signage located at bus stops or a mobile phone app, estimated arrival times of the busses which stop there at. Trucking companies may utilize the disclosed embodiments to predict deliveries, adjust schedules or routes, estimate costs, etc.

Generally, TP speed data is a composite of speed data measured over a period of time, and which may be partitioned based on previously known, recurring or permanent/fixed conditions such as time of day, day of week, scheduled occurrence of sporting or civic events, weather conditions, e.g. precipitation, no precipitation, etc., or combinations thereof, and may be further modeled or processed, such as statistically processed, normalized, etc., so as to provide an accurate estimate of the typical speed of a road at a given time and under a given occurrence of a recurring condition or event. It will be appreciated that modeling and/or statistical processing may be used to remove, or minimize, the effect of anomalous or outlier speed measurements which may skew the estimates. TP data may be centrally computed and accumulated and distributed, such as via a wireless network, on a subscription or other basis, such as via request or TP data for a particular road under particular conditions. Alternatively, or in addition thereto, TP data, or a portion thereof, such as for a given region, may be stored in medium, such as a volatile or non-volatile memory, e.g. an optical media, ROM or flash memory, and distributed to subscribers/purchasers to be used, for example, in conjunction with user's navigation system. Periodic updates to the TP data may then be distributed, via the same medium or via electronically distributed data updates, such as via a network.

Generally, RT data merely provides the current speed of the road measured or modeled at a particular time (or a composite, e.g. average, of measured values over a relatively short interval, e.g. five, ten, twenty or thirty minutes, etc.). As RT data is intended to represent the actual speed at the time of the measurement, the data may generally be provided in a substantially unprocessed form. For example, anomalous, temporarily aberrant and/or outlier RT speed measurements may or may not be retained, depending upon the implementation, so as to, for example, minimize their impact. RT data may be collected from the vehicle of the user using the disclosed embodiments, from other vehicles, e.g. probe vehicles, gps-enabled devices, e.g. smart phones, road sensors, traffic cameras, traffic reports, witnesses, etc. RT data may be centrally collected and distributed/broadcast, e.g. via a wireless network, to receivers/subscribers, such as mobile or portable navigation systems, news organizations, electronic road signs, etc. Alternatively, or in addition thereto, RT data may be collected by a mobile/portable navigation system or traffic reporting system for its own use. It will be appreciated that RT data collected by road sensors, probe vehicles, etc. may be distributed via wireless peer to peer or mesh based networks, e.g. the data is passed from a source and then from vehicle to vehicle, each navigation system within a vehicle being both a consumer of the data and a repeater thereof. In implementation which use RT data from the vehicle itself alone, the disclosed embodiments, as will be described, may provide accurate predicted traffic speeds for the portion of the road that the user is currently navigating as well as portions proximate thereto, such as the next 2-10 miles, e.g. where the user is at or has passed the condition or event which is affecting traffic speeds. Using RT data obtained from other sources aside from the user's vehicle may allow for the disclosed embodiments to provide predicted speeds, as will be described, for other portions of the road network or portions of the user's current route which are further away or on different roads, e.g. where the condition or event is occurring or has occurred ahead of the user's vehicle or where the effects of the condition or event extend further down the road, etc.

Given the historical composite nature of TP data, such data may not account for conditions or events which were previously unknown, have recently occurred with respect to the time, e.g. the present time and succeeding future interval, for which a prediction is desired, or are aberrations, e.g. unanticipated, unique and/or temporary, but which the occurrence thereof may have, for example, a limited but durable effect on traffic speeds in the immediate near future. In fact, such conditions/events having occurred during the sampling of data used to generate TP data may have been purposely excluded from, or their effects minimized in, the calculation of the TP data such that the TP data is more generally applicable. Such conditions or events may include traffic accidents, emergency road construction or lane closures, presence of oversized or specialized transport vehicles, weather events, foreign objects or animals on the road, temporary driver distractions, an upcoming or concluded sporting or entertainment event, etc. Such conditions or events may have an immediate effect on traffic speed of the road and the effect may further last beyond the occurrence. For example, a traffic accident or lane closure may impact traffic speeds for several hours after the accident has been cleared or the lane reopened, though the effect may gradually dissipate/recede and traffic speeds may then return to values more in accord with the TP data. For example, a speed of a road may historically be a particular value but, due to a traffic accident, the speed has been vastly reduced and will be so reduced for several hours while the accident is cleared. In this case, RT data may inform drivers of the current traffic speed but fails to be an informative predictor of the traffic speeds in the near future as this data does not reflect the projected impact of the event or condition, nor the dissipative nature thereof, if any. TP data is also a poor predictor of the traffic speeds subsequent to such an occurrence due to the composite and normalized nature of the data and the temporally recent, unanticipated, unique or temporary nature of the event/condition.

It will be appreciated that the disclosed embodiments are further applicable to the prediction of future traffic speeds due to conditions or events which have recently occurred, i.e. were not present at the time the TP data was gathered, and are expected to remain for a significant period of time. For example, upon the occurrence of a long term construction project or major road damage, e.g. an earthquake or wash out, the TP data may not yet reflect the impact thereof. However, assuming the TP data is regularly updated, it will eventually reflect the impact of the event or condition. Further, once the condition or event is resolved, e.g. the constructions ends or the roadway is otherwise restored, the TP data may not yet, but eventually will, reflect the impact thereof, e.g. the restoration of traffic speeds back to pre-construction/damage levels.

Generally then, the disclosed embodiments may provide improved traffic speed predictions, subsequent to an occurrence (or resolution) of previously unknown, recent, unanticipated, unique and/or temporary events or conditions, until such time as the effect of the event or condition recedes/dissipates and/or the TP data is updated to account therefore, i.e. until the predicted traffic speeds converge with the expected traffic speeds.

The disclosed embodiments combine TP data and RT data over a particular period of time, referred to as the "evaluation window", immediately preceding a time frame for which a predicted traffic speed is desired, referred to as the "prediction window." Generally, in application, the evaluation window will be a period time just prior to the current time and the prediction window will be a period of time just after the current time. As will be discussed, the duration of the evaluation window is implementation dependent and may be of a suitable duration so as to envelop the time intervals for which the TP and RT data is statistically relevant to the desired predicted traffic speeds. As discussed above, the duration of the prediction window may be undefined or otherwise dynamic and of a duration which extends until the predicted speed values converge with the TP speed values. Alternatively, the duration of the prediction window may be extend over a duration for which a confidence in the accuracy of the predicted speed values exceeds a defined threshold.

It will be appreciated that the disclosed embodiments, may be applied to any continuous time periods designated as the evaluation window and prediction window, so as to, for example, validate the disclosed methodology against actual historical data. As will be described, the disclosed embodiments may be continuously or regularly applied, such as every 1, 5, 10, 15, or 30 minutes, as the present time moves forward, i.e. the evaluation and prediction windows may be sliding windows, providing for continuous accurate forward predictions. It will further be appreciated that the disclosed embodiments may further be implemented as part of the general data processing for providing predicted speeds regardless of whether a suitable event/condition occurs. It will be understood that in operation of such an implementation, lacking the occurrence of a suitable event/condition, the predicted speeds are likely, even expected, to closely track the TP data alone. In one embodiment, where the predicted speeds deviate from the TP data when there are no recent events/conditions or aberrations, e.g. because the RT speed values are deviating, the deviations may be utilized as a basis for evaluation of the TP data processing methodology or otherwise be used to update the TP data for future application. For example, such a situation may be indicative of a flaw in the TP data generating process.

Using the RT and TP data for a given evaluation window, the disclosed embodiments identify and extrapolate a trend in traffic speeds extending into and/or through the prediction window, accounting for both the impact of the condition or event and the dissipative nature, if any, thereof. For recent but persistent events/conditions which are not yet reflected in the TP data, the disclosed embodiments may provide accurate predictions until such time as the TP data is appropriately updated to account for the long term effects thereof. That is, the duration of the prediction window may be for the length of time until the predicted speeds converge with the expected speeds derived from the TP data, whether the effect of the event/condition dissipates and/or the TP data is updated to accommodate for the event/condition.

In one embodiment, the disclosed trend based extrapolation method may be implemented in a central computer system and/or in a navigation system, such as a personal/portable or automobile based navigation system, and may include a series of computer executable program/logic implemented steps which, in the exemplary application detailed below, will be explained using exemplary RT and TP speed values for a particular road segment for a particular evaluation window, e.g. from epoch 61 (4-4:15 pm), epoch 62 (4:15-4:30 pm), epoch 63 (4:30-4:45 pm), and epoch 64 (4:45-5 pm) to demonstrate a prediction that can be made for a subsequent prediction window, e.g. the time window between epoch 65 and epoch 72 (5-7 pm). It will be appreciated that the duration and resolution/granularity of the evaluation and prediction windows is implementation dependent and may range from a course granularity, e.g. 15 minute increments/epochs to a finer granularity, e.g. 1 second increments/epochs, including a continuous or substantially continuous duration. Further the duration of the evaluation window may range, for example, from the prior 1 hour to the prior 1 week, etc. In one embodiment, an evaluation window of 1.25 hours, broken into five increments of 15 minute duration, is utilized. The duration and resolution of the prediction window, as will be described, may follow from the duration and resolution of the evaluation window, as well as the magnitude of the deviation between the RT and TP data for the evaluation window, and may be as long as required to reflect impact and subsequent dissipative effect, if any, on the traffic speeds until, for example, they return/converge to speeds which are generally in accord with the TP data or otherwise beyond the convergence, e.g. to demonstrate that the TP speed values are accurate.

First, the speed differences between the RT and TP speeds for the evaluation window, i.e. epochs 61, 62, 63, 64, are calculated as follows. The resultant differences provide an indication of the difference in speed along the road between the most recent measurements and the composite historical value provided by the TP values. In an alternative embodiment, the last 5 epochs may be used.

$$s_1 = RT_{61} - TP_{61}$$

$$s_2 = RT_{62} - TP_{62}$$

$$s_3 = RT_{63} - TP_{63}$$

$$s_4 = RT_{64} - TP_{64}$$

FIG. 1 shows RT (black) and TP (red-dotted) speeds for Epochs 61-64. Table 1 shows the speed difference calculation.

TABLE 1

Speed Difference Calculation

| Epoch | 61 | 62 | 63 | 64 |
|---|---|---|---|---|
| RT | 54 | 54 | 43 | 20 |
| TP | 53 | 51 | 48 | 45 |
| | s1 | s2 | s3 | s4 |
| Difference | 1 | 3 | −5 | −25 |

Second, the average difference of all four epochs is calculated, weighting the difference in the latest epoch the most and the difference in the oldest epoch the least to reflect that more recent events are more significant with respect to the future than older events. A simple weighting mechanism may be used to assign weights proportional to the square of the order of the epochs as shown in Table 2. It will be appreciated that the selected weighting methodology, as well as the weighting values used, is implementation dependent and may be utilized to diminish, e.g. gradually, the significance of older epochs, i.e. the further back in time, the less significant the data is to the future traffic speed. For example, weightings may be chosen which proportionally diminish the significance or may exponentially diminish the significance of older time periods.

TABLE 2

Showing an Exemplary Weighting Scheme

| | Epoch | | | |
|---|---|---|---|---|
| | 61<br>w1 | 62<br>w2 | 63<br>w3 | 64<br>w4 |
| order | 1 | 2 | 3 | 4 |
| $(\text{order})^2$ | 1 | 4 | 9 | 16 |
| $\Sigma(\text{order})^2$ | 30 | 30 | 30 | 30 |
| Weights | 1/30 | 4/30 | 9/30 | 16/30 |
| Percentage | 4% | 13% | 30% | 53% |

The weighted difference s is calculated as:

$$S = \frac{s_1 * w_1 + s_2 * w_2 + s_3 * w_3 + s_4 * w_5}{(w_1 + w_2 + w_3 + w_4)}$$

$$S = \frac{(0.53 * -25) + (0.3 * -5) + (0.13 * 3) + (.04 * 1)}{1} = -14.4$$

Using the exemplary weighting values from Table 2 and applying them to the four values in Table 1 gives a weighted difference of approximately −14 mph for the past hour. As discussed above, any other weighting scheme may also be used.

Third, the rate of change of difference between RT and TP speeds in the most recent epoch's, such as the last two epochs, is calculated (i.e., to determine if the RT and TP speeds are diverging from each other). If the rate of change of difference has been increasing, then it is expected to continue increasing into the future before converging towards TP speeds. This should be accounted for in the prediction. The following equations are used to calculate the rate of change d.

$$d_1=s_4-s_3$$

$$d_2=s_3-s_2$$

In one embodiment, if the rate of change is either increasing or decreasing, an average rate of change is computed, otherwise the rate of change is set to zero. For example:

if $((d_1 \geq d_2$ and $d_1>0$ and $d_2>0)$ or $(d_1 \leq d_2$ and $d_1<0$ and $d_2<0))$ or if $((d_1 \geq d_2$ and $d_1<0$ and $d_2<0)$ or if $(\mathrm{abs}(d_1) \leq \mathrm{abs}(d_2)$ and $d_1<0$ and $d_2<0))$ $d=(d_1+d_2)/2$ else, $d=0$ In an alternative embodiment, to avoid spikes in the predicted speed values or otherwise generate a smooth and more useful prediction that minimizes the effect of unstable speed values, i.e. minimizes noisy predictions, the average is rate of change may be computed, regardless of whether the rate is increasing, decreasing or stable, as:

$$d=(d_1+d_2)/2$$

It will be appreciated that other functions, other than an average, may be utilized to minimize noise predictions values.

TABLE 3

Showing the Rate of Change

| Epoch | 62-63 ($d_1$) | 63-64 ($d_2$) |
|---|---|---|
| Rate of change | −8 | −20 |

For this example, the rate of change of differences between epoch 62-63 ($d_1$) and rate of change of differences between epochs 63-64($d_2$) are calculated. Table 3 shows the values of $d_1$ and $d_2$. The rate of change of the speed difference is −8 mph between epoch 62 and 63 and decreases further to −20 mph between epoch 63 and 64. Based on the equations described earlier in this step, d is calculated as the mean of −8 and −20, which is −14 mph.

Fourth, a trend value is calculated for the evaluation window as the sum of the weighted speed difference (s from step 2) and average rate of change (d from step 3). The trend value quantifies the degree of difference of the current flow conditions to what is typically expected. Therefore, adjusting the TP speed as a function of the trend value, such as by adding the trend value to the TP speed, results in greater accuracy than just using TP speed values alone.

$$\text{Trend}=s+d$$

In the example, Trend=−14+(−14)=−28 mph

Fifth, for the first increment of the prediction window, i.e. epoch 65, the predicted speed P65 is adjusted as a function of the trend value, e.g. the predicted speed is the sum of the TP speed at epoch 65 and the trend value, unadjusted, calculated in step 4:

$$P_{65}=\text{TP}_{65}+\text{Trend}$$

In this example, $P_{65}$ is 42−28=14 mph

Sixth, to predict speeds for remainder of the prediction window, i.e. the epochs farther away from the current epoch, the trend value should be applied, assuming it is dissipative in nature, in a decreasing or otherwise diminishing fashion before it eventually becomes 0 at which point the predicted speeds will be the same as TP speeds. This is done because TP speeds may be considered to be the best estimate of traffic speeds in the long term without any additional information due, for example, to the fact that a significant percentage of all traffic slowdowns may be due to recurring congestion. It will be appreciated that in a sliding window implementation where the evaluation and prediction windows continually or regularly move forward as the present time advances, the epochs which were further away come closer and are recalculated and may thereby account for events or conditions for which the effect on traffic speeds does not diminish as expected.

Another characteristic of the decreasing effect of the trend value is that the larger the trend value the longer it may persist, and the smaller the trend value the shorter it may persist. For example, incidents involving lane closures, which make speed values deviate significantly from TP speeds, may result in large trend values and it is well known that this type of congestion lasts for a significant amount of time. Smaller trend values indicate that the current conditions are similar to typically expected conditions modeled by TP speeds and the predicted speeds should quickly converge to it. An exponential decay function incorporates these characteristics and may be best suited to model the decrease in trend that should be applied for the future epochs of the prediction window.

A general exponential decay function is of the form:

$$x=e^{-t/x}*x$$

where x is the value that is being decayed and t is the time period. The decay value itself is used as part of the decay constant to model the characteristic that larger trends persist longer and smaller trend disappear quickly. It will be appreciated that other decay functions may be used.

Figure 2:
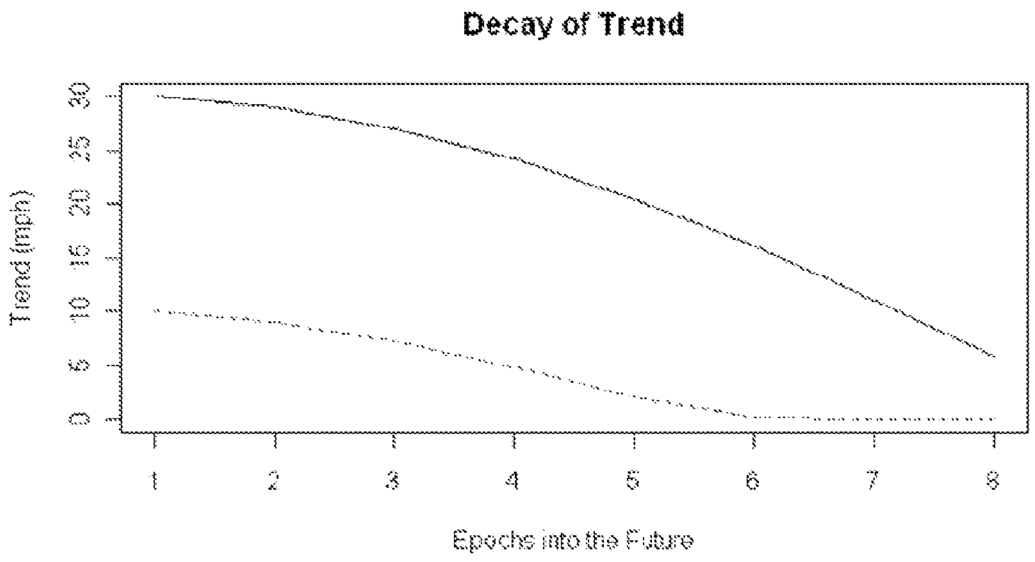
FIG. 2 is a graph showing a decreasing trend value for predictions up to two hours in the future, according to an example.

Applying this generic function to the trend value, results in the following equation.

$$\text{Trend}=\left(e^{-\frac{t}{trend}}\right)*\text{Trend}$$

where t is the number of epochs into the future from the first prediction epoch of the prediction window. Applying this equation to two different exemplary trend values of 30 mph and 10 mph, produces the following curves as shown in FIG. 2. In FIG. 2, the black line shows the decay for a trend value of 30 mph over 2 hrs (eight fifteen minute epochs) and the red dotted line shows the decay for a trend value of 10 mph over the same 2 hrs.

For the prediction at epoch 66, the trend is decreased using the exponential decay equation by substituting t=1, since epoch 66 is one epoch away from epoch 65.

$$\text{Trend}=e^{\frac{-1}{(Trend)}}*\text{Trend}$$

The predicted speed at epoch 66 is: $P_{66}=\text{TP}_{66}+\text{Trend}$. For the prediction at epoch 67, the trend will be decreased further, using the equation by substituting t=2 and trend value with the updated trend calculated for epoch 66.

$$\text{Trend}=e^{\frac{-2}{(\text{Trend})}}*\text{Trend}$$

The predicted speed at epoch 67 would be $P_{67}=\text{TP}_{67}+\text{Trend}$. Similarly, the predicted speeds can be calculated for rest of the epochs 68 to 72.

Figure 3:
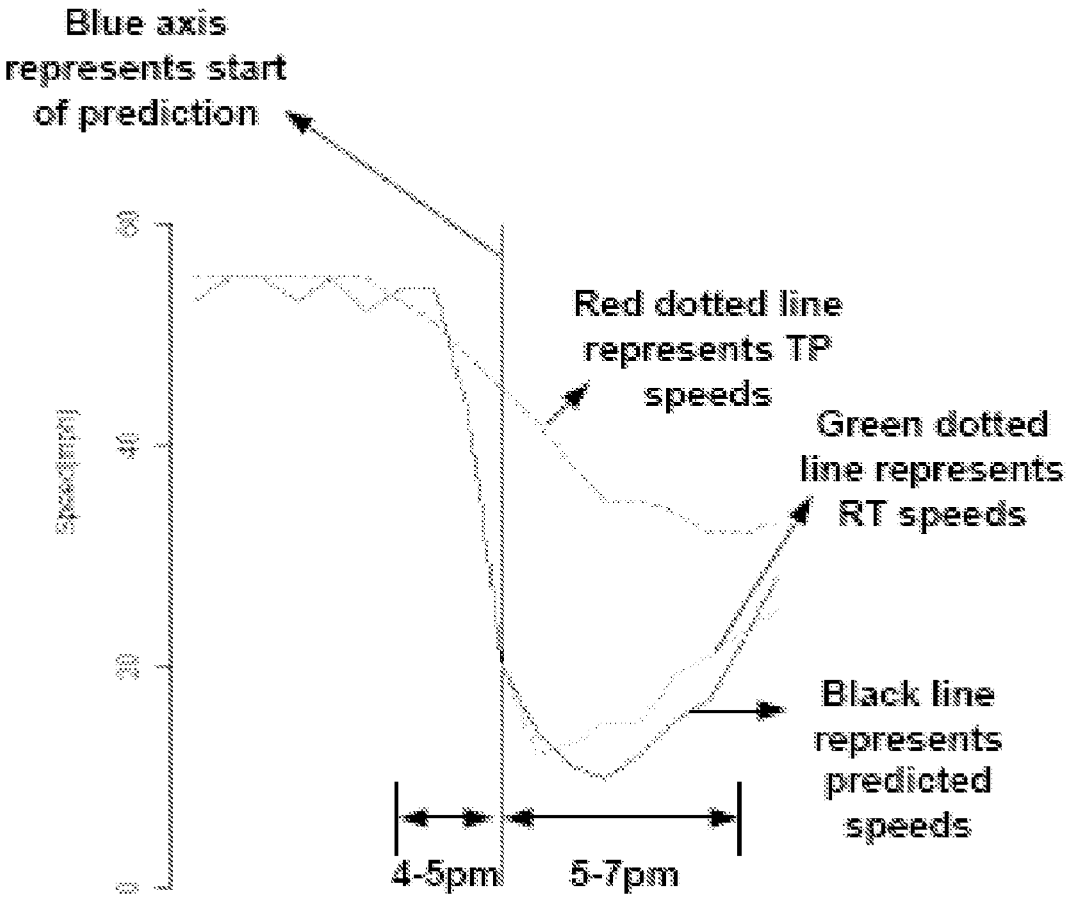
FIG. 3 is a graph showing predicted traffic speeds for a road segment from 5-7 pm using real time and historic traffic speeds from 4-5 pm, according to an example.

FIG. 3 shows the predicted speeds for a road segment from 5-7 pm using RT and TP speeds from 4-5 pm. FIG. 3 shows the predicted speeds (black line) to the right of the blue axis in relation to the RT (dotted green line) and TP (dotted red line) speeds graphically for up to 2 hours into the future using the RT and TP speed values from 4-5 pm (epoch 61 to 64) from the example. As can be seen from FIG. 3, the predicted speeds derived using this method correlates very well with the real time speeds shown by the green dotted line.

While the exemplary application above was described with respect to generalized TP data which may be normalized for various known, recurring or permanent conditions, it will be appreciated that, as was described above, optimized or otherwise categorized, segmented or compartmentalized TP data for particular known, recurring or permanent conditions may be provided. For example, TP data may be computed for precipitation and no precipitation, for rush hour and non rush hour periods, for weekends and for weekdays, based on known sporting or entertainment event schedules, etc. or combinations thereof. Based on the occurrence of the known, recurring or permanent condition, the appropriate category of TP data may be used, thereby improving the predicted speed values. For example, if it is snowing, then the disclosed embodiments may use the traffic patterns speeds typically expected when it is snowing as opposed to a general traffic patterns speeds.

Figure 4:
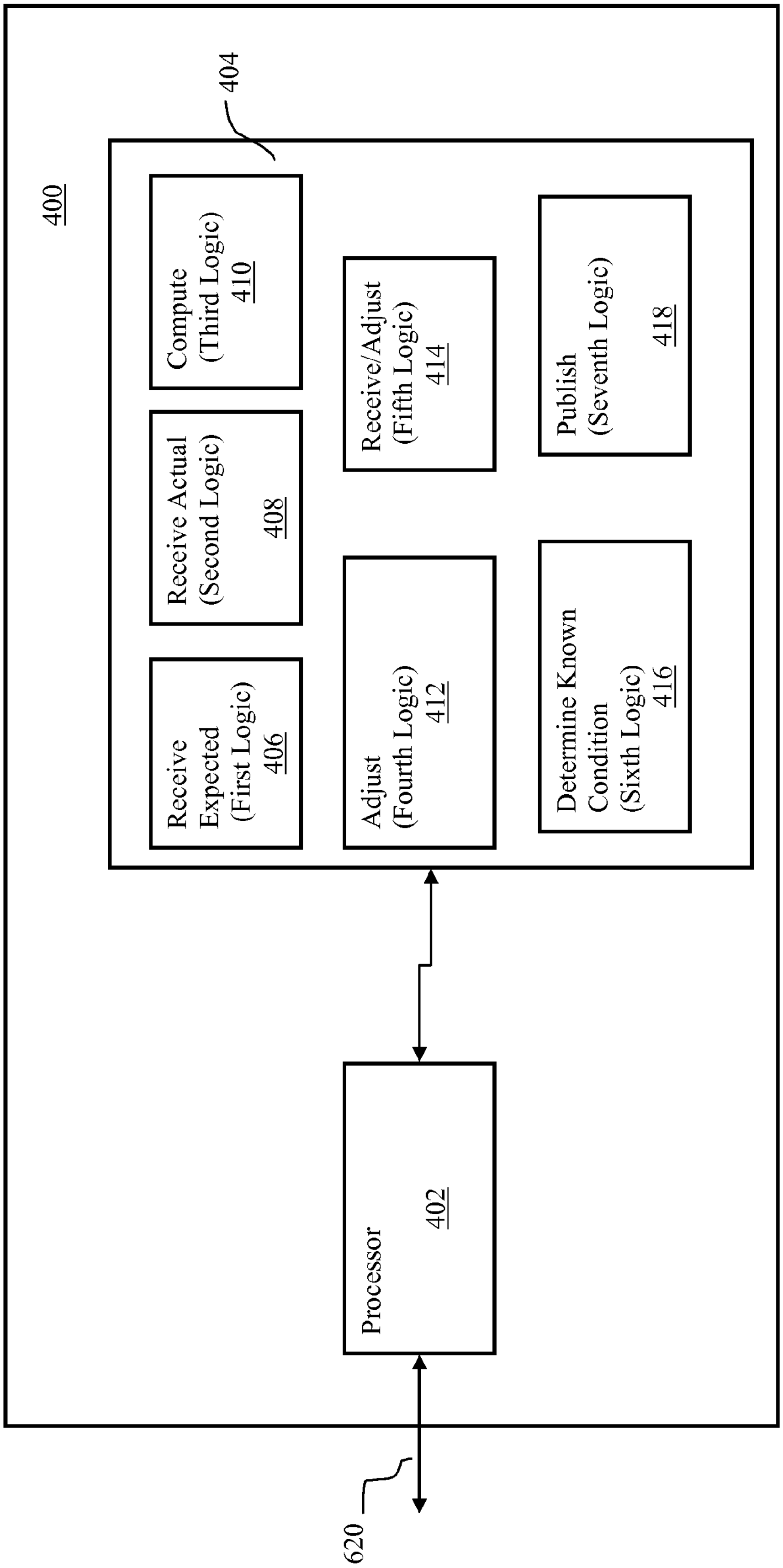
FIG. 4 is a block diagram of an exemplary implementation of the system for predicting traffic speeds according to the disclosed embodiments.

FIG. 4 shows a system 400 for adjusting a future expected speed value of a portion of a road based on trend determined from deviation of actual speed values from previous expected speed values for previous portions of the road to account for the effect on the speed of the road for previously unknown, recent, or aberrant conditions or events.

The system 400 includes a processor 402 and a memory 404 coupled therewith which may be implemented by one or more of the processor 602 and memory 604 as described below with respect to FIG. 6. In particular, the system 400 may be implemented, at least in part, in a mobile device, such as a cellular telephone, smart phone, mobile (portable or car based) navigation device or tablet computing device. Further, one or more parts, or the entirety, of the system 400 may be implemented in a server, e.g. remote from the mobile device, coupled with the mobile device via a network, such as a wired or wireless network, or combination thereof, e.g. the network 620 described below with respect to FIG. 6. In a server based implementation, the predicted traffic speed values may be pushed to the mobile device, such as based on subscription basis, or provided upon demand, i.e. upon receipt of a request therefore from the mobile device.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The system 400 further includes first logic 406 stored in the memory 404 and executable by the processor 402 to cause the processor 402 to receive an expected speed value, e.g. traffic pattern data, of at least a portion of a road for each of a successive plurality of previously occurring time periods, e.g. the evaluation window, prior to, or including, a current time period, or defined boundary time period between the specified evaluation window and desired prediction window, and an expected speed value for a yet to occur, e.g. upcoming, time period subsequent thereto, e.g. the prediction window or first incremental portion thereof. The expected speed values may be received from a database (not shown) coupled with the system 400, directly or via a network, such as the network 620, or from a traffic data service, such as via the network 620, which, as described, compiles and generates such data. Alternatively, or in addition thereto, the system 400 may include logic (not shown) which accumulates traffic speed data and computes expected speed values for use thereby.

The system 400 also includes second logic 408 stored in the memory 404 and executable by the processor 402 to cause the processor 402 to receive an actual speed value, e.g. RT data, for the portion of the road for each of the successive plurality of previously occurring time periods prior to the current time period, e.g. the evaluation window. Actual speed values may be received, as described above, via a network, such as the network 620, from probe vehicles suitably adapted to report real time speed data, road sensors, traffic reports, witnesses, etc. Such data may be collected by a third party service provider which may or may not be a separate entity from the operator of the system 400. Alternatively, or in addition thereto, the system 400 may include logic (not shown) which obtains actual speed values from the vehicle in which the system 400 is implemented for use thereby, such as via the vehicle speedometer, vehicle computer, wheel sensors, etc.

The system 400 also includes third logic 410 stored in the memory 404 and executable by the processor 402 to cause the processor 402 to compute a speed value trend based on the received expected speed values for the successive plurality of previously occurring time periods and the received actual speed values.

In one embodiment, the third logic 410 is further executable by the processor 402 to cause the processor 402 to: calculate a weighted average difference between the expected speed values and the actual speed values for the successive plurality of previously occurring time periods; calculate a rate of change of a difference between the expected speed value and the actual speed value of at least a two of the successive plurality of previously occurring time periods closest to the current time period; and wherein the speed value trend is computed as a function of the calculated average difference and the calculated rate of change.

The system 400 also includes fourth logic 412 stored in the memory 404 and executable by the processor 402 to cause the processor 402 to adjust the expected speed value(s) for the portion of the road for at least the yet to occur time period, e.g. the prediction window or first incremental portion thereof, based on the computed speed value trend wherein the adjusted expected speed value is the predicted speed value for the portion of the road for the upcoming time period.

In one embodiment, the system 400 further includes fifth logic 414 stored in the memory 404 and executable by the processor 402 to cause the processor 402 to receive an expected speed value for the portion of the road for each of a successive plurality of time periods succeeding the yet to occur time period, e.g. the remaining increments of the prediction window, and for each of the successive plurality of time periods succeeding the yet to occur time period, adjust the computed speed value trend and, further, adjust, based thereon, the expected speed value of the associated time period of the successive plurality of time periods succeeding the yet to occur time period. In one embodiment, the adjustment of the computed speed value trend further include a diminishment of the computed speed value trend, e.g. a reduction of a positive speed value trend or increase of a negative speed value trend. For example, the adjustment may include an exponential decay function applied to the computed speed value trend. Wherein a number of successive time periods over which the speed value trend is reduced or otherwise diminished until the speed value trend is at or near zero, e.g. the duration of the prediction window, is based on the a magnitude of a difference between the expected speed value for the portion of the road for the yet to occur time period and the adjusted expected speed value of the portion of the road for the yet to occur time period.

In one embodiment of the system 400, the first 406, second 408, third 410 and fourth logic 412 are repeatedly executable by the processor 402 as the current time period advances. For example, every 1, 5, 10, 15 or 30 minutes. Alternatively, the repetition interval may vary or otherwise be dynamic. For example, execution may be triggered when the RT data deviates from the TP data by a threshold value.

In one embodiment, the system 400 further includes sixth logic 416 stored in the memory 404 and executable by the processor 402 to cause the processor 402 to determine a known condition of the portion of the road wherein the received expected speed values comprise expected speed values of the portion of the road accounting for the known condition, such as via the receipt of data indicative thereof. For example, the known condition may include one of time of day, day of week, weather condition, events, road construction, or combinations thereof. It will be appreciated that the system 400, via the sixth logic 416, may receive data representative of the known condition from an external source, e.g. via a wireless network as described above, such as a traffic or news service. Alternatively, or in addition thereto, the sixth logic 416 may include calendar/clock logic operative to determine the time of day, day of week, etc., or otherwise be coupled with one or more sensors such as precipitation, barometric, temperature and or humidity sensors so as to be able to determine ambient weather conditions.

In one embodiment, the system 400 may further include seventh logic 418 stored in the memory 404 and executable by the processor 402 to cause the processor 402 to publish, such as via the network 620, the adjusted expected speed value for the portion of the road for the yet to occur time period.

Figure 5:
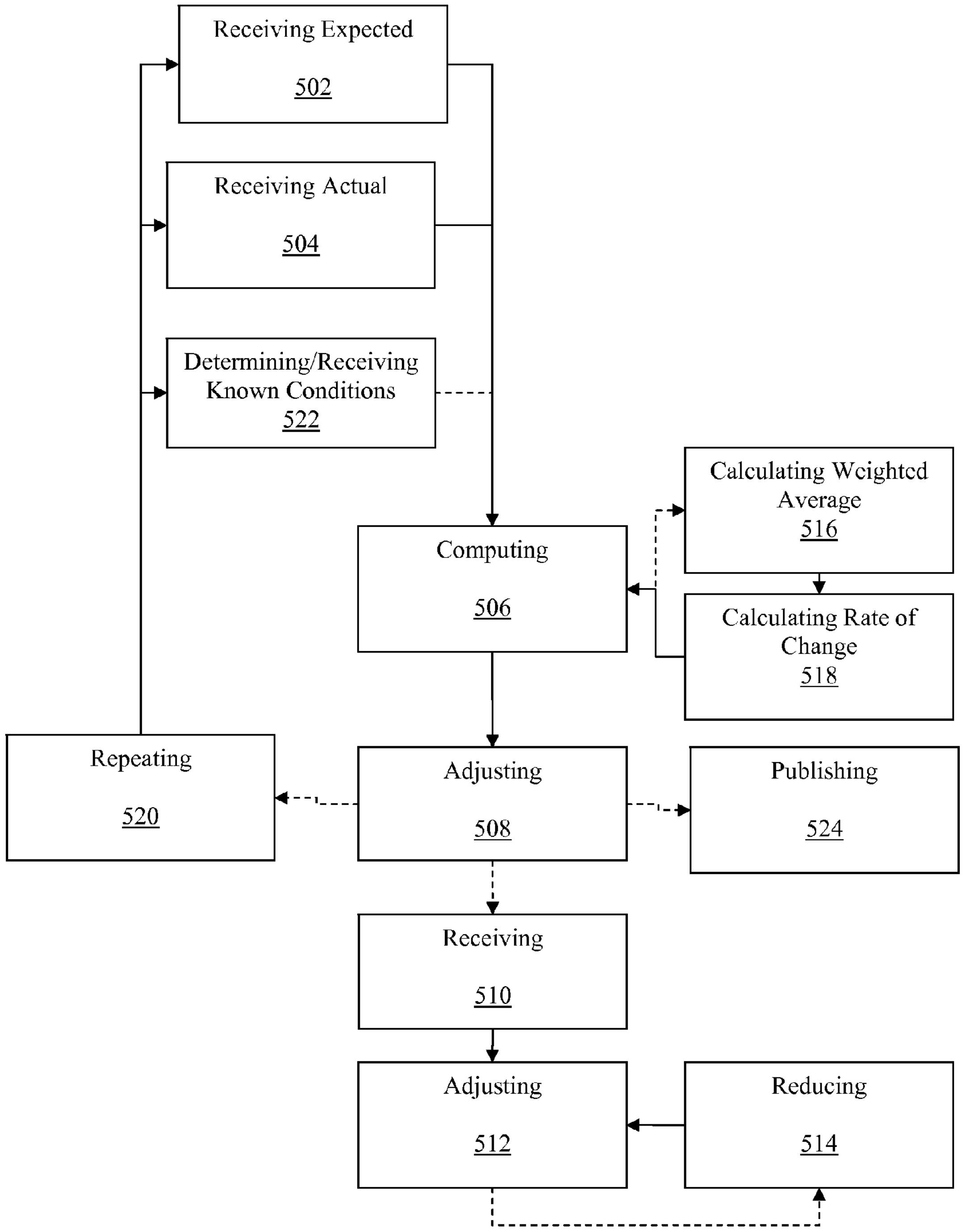
FIG. 5 depicts a flow chart showing operation of the system of FIG. 4.

FIG. 5 depicts a flow chart showing operation of the system 400 of FIG. 4. In particular FIG. 5 shows a computer implemented method including: receiving, by a processor 402, an expected speed value of at least a portion of a road for each of a successive plurality of previously occurring time periods prior to, or including, a current time period and an expected speed value for a yet to occur time period subsequent thereto [block 502]; receiving, by the processor 402, an actual speed value for the portion of the road for each of the successive plurality of previously occurring time periods prior to the current time period [block 504]; computing, by the processor 402, a speed value trend based on the received expected speed values for each of the successive plurality of previously occurring time periods prior to the current time period and the received actual speed values [block 506]; and adjusting, by a processor 402, the expected speed value(s) for the portion of the road for at least the yet to occur time period, e.g. the prediction window, based on the computed speed value trend [block 508].

The operation of the system 400 may further include receiving, by the processor 402, an expected speed value for the portion of the road for each of a successive plurality of time periods succeeding the yet to occur time period [block 510]; and for each of the successive plurality of time periods succeeding the yet to occur time period, adjusting, by the processor 402, the computed speed value trend and, further, adjusting, based thereon, the expected speed value of the associated time period of the successive plurality of time periods succeeding the yet to occur time period [block 512]. The adjusting of the computed speed value trend may further include diminishing the computed speed value trend [block 514]. Wherein a number of successive time periods over which the speed value trend is reduced or otherwise diminished until the speed value trend is at or near zero may be based on the a magnitude of a difference between the expected speed value for the portion of the road for the yet to occur time period and the adjusted expected speed value of the portion of the road for the yet to occur time period.

In one embodiment, the computing of the speed value trend may further include: calculating, by the processor 402, a weighted average difference between the expected speed valued and the actual speed values for the successive plurality of previously occurring time periods [block 516]; calculating, by the processor 402, a rate of change of a difference between the expected speed value and the actual speed value of at least a two of the successive plurality of previously occurring time periods closest to the current time period [block 518]; and wherein the speed value trend is computed as a function of the calculated average difference and the calculated rate of change.

The operation of the system 400 may further repeating, by the processor 402 periodically, such as every minute, the receiving of the expected speed values and actual speed values, the computing and the adjusting as the current time period advances [block 520].

The operation of the system 400 may further include determining, or otherwise receiving data indicative of, by the processor 402, a known condition of the portion of the road wherein the received expected speed values comprise expected speed values of the portion of the road accounting for the known condition [block 522]. Wherein the known condition comprises one of time of day, day of week, weather condition, events, road construction, or combinations thereof.

The operation of the system 400 may further include publishing, by the processor 402, the adjusted expected speed value for the portion of the road for the yet to occur time period [block 524].

Figure 6:
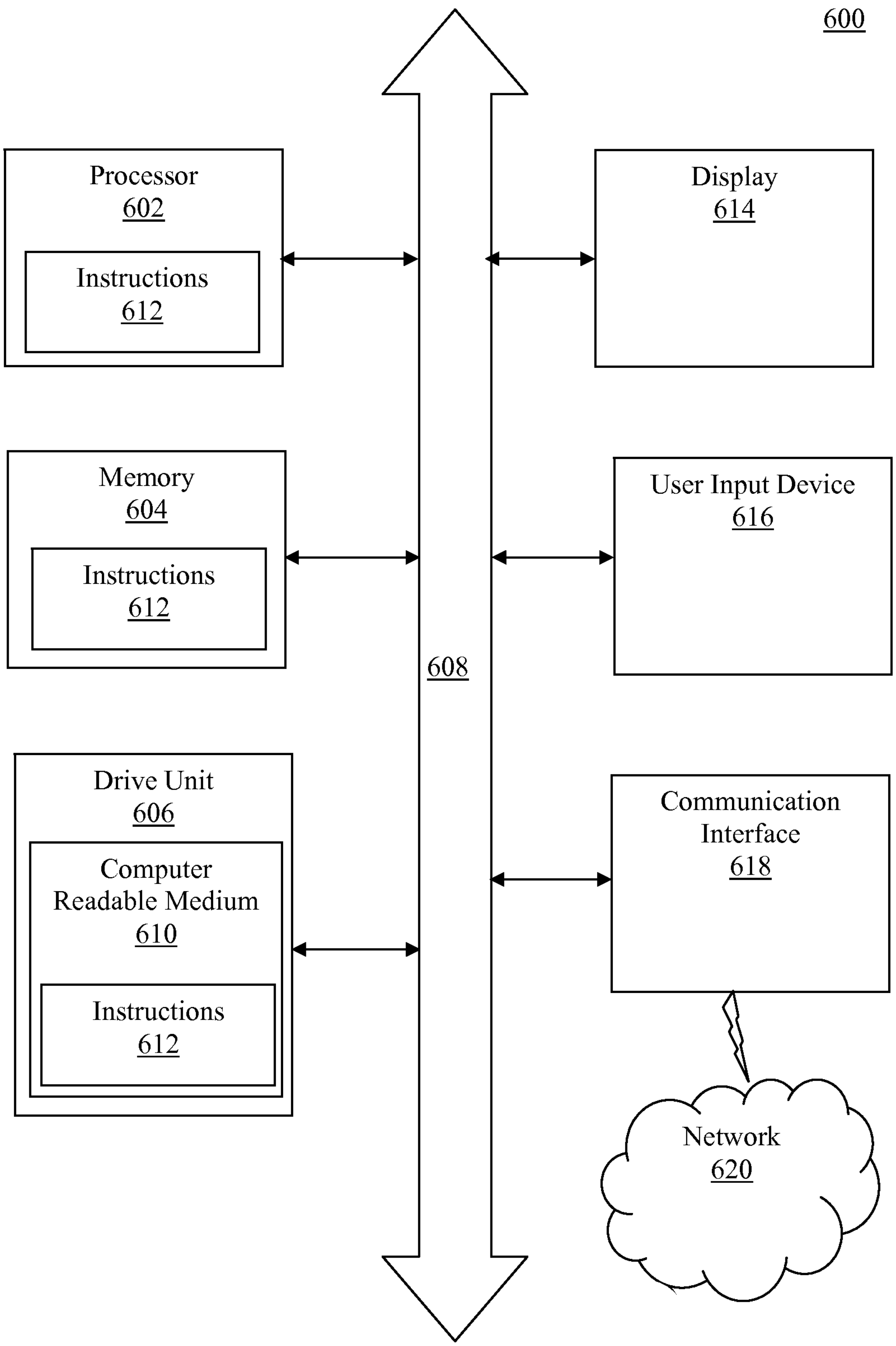
FIG. 6 shows an illustrative embodiment of a general computer system for use with the system of FIG. 4.

Referring to FIG. 6, an illustrative embodiment of a general computer system 600 is shown. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. Any of the components discussed above, such as the processor 402, may be a computer system 600 or a component in the computer system 600. The computer system 600 may implement a navigation system, of which the disclosed embodiments are a component thereof.

In a networked deployment, the computer system 600 may operate in the capacity of a server or as a client user computer in a client-server user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 3, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions 612 stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 614, such as a liquid crystal display (LCD), an organic light emitting diode (OLED), a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in the drive unit 606. A tactile output may further be provides such a mechanical or piezoelectric vibration motor.

Additionally, the computer system 600 may include an input device 616 configured to allow a user to interact with any of the components of system 600. The input device 616 may be a number pad, a keyboard, or a cursor control device, such as a mouse, or a joystick, touch screen display, remote control, accelerometer, motion sensor, proximity sensor, optional sensor, e.g. a camera, or any other device operative to interact with the system 600.

In a particular embodiment, as depicted in FIG. 6, the computer system 600 may also include a disk or optical drive unit 606. The disk drive unit 606 may include a computer-readable medium 610 in which one or more sets of instructions 612, e.g. software, can be embedded. Further, the instructions 612 may embody one or more of the methods or logic as described herein. In a particular embodiment, the instructions 612 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 612 or receives and executes instructions 612 responsive to a propagated signal, so that a device connected to a network 620 can communicate voice, video, audio, images or any other data over the network 620. Further, the instructions 612 may be transmitted or received over the network 620 via a communication interface 618. The communication interface 618 may be a part of the processor 602 or may be a separate component. The communication interface 618 may be created in software or may be a physical connection in hardware. The communication interface 618 is configured to connect with a network 620, external media, the display 614, or any other components in system 600, or combinations thereof. The connection with the network 620 may be a physical connection, such as a wired Ethernet connection or may be established wirelessly as discussed below. Likewise, the additional connections with other components of the system 600 may be physical connections or may be established wirelessly.

The network 620 may include wired networks, wireless networks, or combinations thereof. The wireless network may be a cellular telephone network, an 802.11, 802.16, 802.20, or WiMax network. Further, the network 620 may be a public network, such as the Internet, a private network, such as an intranet, or combinations thereof, and may utilize a variety of networking protocols now available or later developed including, but not limited to TCP/IP, peer to peer and mesh based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single non-transitory medium, the term "computer-readable medium" includes a single non-transitory medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method for predicting traffic speeds, comprising:

calculating, by a processor, speed differences between real time data and historic data for a plurality of epochs;

calculating, by the processor, an average difference of the plurality of epochs, weighting the difference in the most recent epoch most and the difference in the oldest epoch least;

calculating, by the processor, a rate of change of the difference between the real time data and the historic data in the last two epochs;

calculating, by the processor, a trend value as a sum of the calculated average difference and the calculated rate of change;

predicting, by the processor, a speed at a next epoch as a sum of the historic speed for the next epoch and the calculated trend value; and predicting, by the processor, a speed at a future epoch by applying the trend value in a decreasing fashion.

2. The method of claim 1 wherein the plurality of epochs comprises at least four epochs.

3. A computer implemented method comprising:

receiving, by a processor, an expected speed value of at least a portion of a road for each of a successive plurality of previously occurring time periods prior to or including a current time period and an expected speed value for a yet to occur time period subsequent thereto;

receiving, by the processor, an actual speed value for the portion of the road for each of the successive plurality of previously occurring time periods prior to the current time period;

computing, by the processor, a speed value trend based on the received expected speed values for each of the successive plurality of previously occurring time periods prior to the current time period and the received actual speed values; and adjusting, by a processor, the expected speed value for the portion of the road for at least the yet to occur time period based on the computed speed value trend.

4. The computer implemented method of claim 3 further including:

receiving, by the processor, an expected speed value for the portion of the road for each of a successive plurality of time periods succeeding the yet to occur time period; and for each of the successive plurality of time periods succeeding the yet to occur time period, adjusting, by the processor, the computed speed value trend and, further, adjusting, based thereon, the expected speed value of the associated time period of the successive plurality of time periods succeeding the yet to occur time period.

5. The computer implemented method of claim 4 wherein the adjusting of the computed speed value trend further includes diminishing the computed speed value trend.

6. The computer implemented method of claim 5 wherein a number of successive time periods over which the speed value trend is diminished until the speed value trend is at or near zero is based on the a magnitude of a difference between the expected speed value for the portion of the road for the yet to occur time period and the adjusted expected speed value of the portion of the road for the yet to occur time period.

7. The computer implemented method of claim 3 wherein the computing further comprises:

calculating, by the processor, a weighted average difference between the expected speed valued and the actual speed values for the successive plurality of previously occurring time periods;

calculating, by the processor, a rate of change of a difference between the expected speed value and the actual speed value of at least a two of the successive plurality of previously occurring time periods closest to the current time period; and wherein the speed value trend is computed as a function of the calculated average difference and the calculated rate of change.

8. The computer implemented method of claim 3 further comprising repeating, by the processor periodically, the receiving of the expected speed values and actual speed values, the computing and the adjusting as the current time period advances.

9. The computer implemented method of claim 3 further comprising:

determining, by the processor, a known condition of the portion of the road wherein the received expected speed values comprise expected speed values of the portion of the road accounting for the known condition.

10. The computer implemented of claim 9 wherein the known condition comprises one of time of day, day of week, weather condition, sporting event, civic event, entertainment event, road construction, or combinations thereof.

11. The computer implemented method of claim 3 further comprising publishing, by the processor, the adjusted expected speed value for the portion of the road for the yet to occur time period.

12. A system comprising:

a processor and a memory coupled therewith; and first logic stored in the memory and executable by the processor to cause the processor to receive an expected speed value of at least a portion of a road for each of a successive plurality of previously occurring time periods prior to or including a current time period and an expected speed value for a yet to occur time period subsequent thereto;

second logic stored in the memory and executable by the processor to cause the processor to receive an actual speed value for the portion of the road for each of the successive plurality of previously occurring time periods prior to the current time period;

third logic stored in the memory and executable by the processor to cause the processor to compute a speed value trend based on the received expected speed values for the successive plurality of previously occurring time periods and the received actual speed values; and fourth logic stored in the memory and executable by the processor to cause the processor to adjust the expected speed value for the portion of the road for at least the yet to occur time period based on the computed speed value trend.

13. The system of claim 12 further including:

fifth logic stored in the memory and executable by the processor to cause the processor to receive an expected speed value for the portion of the road for each of a successive plurality of time periods succeeding the yet to occur time period, and for each of the successive plurality of time periods succeeding the yet to occur time period, adjust the computed speed value trend and, further, adjust, based thereon, the expected speed value of the associated time period of the successive plurality of time periods succeeding the yet to occur time period.

14. The system of claim 13 wherein the adjustment of the computed speed value trend further include a diminishment of the computed speed value trend.

15. The system of claim 14 wherein a number of successive time periods over which the speed value trend is diminished until the speed value trend is at or near zero is based on the a magnitude of a difference between the expected speed value for the portion of the road for the yet to occur time period and the adjusted expected speed value of the portion of the road for the yet to occur time period.

16. The system of claim 12 wherein the third logic is further executable by the processor to cause the processor to:

calculate a weighted average difference between the expected speed valued and the actual speed values for the successive plurality of previously occurring time periods;

calculate a rate of change of a difference between the expected speed value and the actual speed value of at least a two of the successive plurality of previously occurring time periods closest to the current time period; and wherein the speed value trend is computed as a function of the calculated average difference and the calculated rate of change.

17. The system of claim 12 wherein the first, second, third and fourth logic are repeatedly executable by the processor as the current time period advances.

18. The system of claim 12 further comprising:

sixth logic stored in the memory and executable by the processor to cause the processor to determine a known condition of the portion of the road wherein the received expected speed values comprise expected speed values of the portion of the road accounting for the known condition.

19. The system of claim 18 wherein the known condition comprises one of time of day, day of week, weather condition, sporting event, civic event, entertainment event, road construction, or combinations thereof.

20. The system of claim 12 further comprising seventh logic stored in the memory and executable by the processor to cause the processor to publish the adjusted expected speed value for the portion of the road for the yet to occur time period.

* * * * *